(12) United States Patent
Olbert et al.

(10) Patent No.: US 8,492,587 B2
(45) Date of Patent: Jul. 23, 2013

(54) REACTOR AND PROCESS FOR PREPARING PHOSGENE

(75) Inventors: Gerhard Olbert, Dossenheim (DE); Wolfgang Gerlinger, Limburgerhof (DE); Byoung-Yeon Kim, Baton Rouge, LA (US)

(73) Assignee: BASF SE, Ludwigshafen (DE)

( * ) Notice: Subject to any disclaimer, the term of this patent is extended or adjusted under 35 U.S.C. 154(b) by 111 days.

(21) Appl. No.: 13/140,194

(22) PCT Filed: Dec. 16, 2009

(86) PCT No.: PCT/EP2009/067239
§ 371 (c)(1),
(2), (4) Date: Jun. 16, 2011

(87) PCT Pub. No.: WO2010/076209
PCT Pub. Date: Jul. 8, 2010

(65) Prior Publication Data
US 2011/0269995 A1    Nov. 3, 2011

(30) Foreign Application Priority Data
Dec. 16, 2008    (EP) ................................. 08171726

(51) Int. Cl.
*C07C 51/58*    (2006.01)
*B01J 8/06*    (2006.01)

(52) U.S. Cl.
USPC ............ 562/847; 562/848; 422/312; 422/601

(58) Field of Classification Search
USPC .................... 562/847, 848; 568/387; 422/312, 422/601
See application file for complete search history.

(56) References Cited

U.S. PATENT DOCUMENTS

| | | | | |
|---|---|---|---|---|
| 3,807,963 | A | * | 4/1974 | Smith ............................ 422/652 |
| 4,231,959 | A | * | 11/1980 | Obrecht ........................ 562/847 |
| 2005/0118088 | A1 | | 6/2005 | Olbert et al. |
| 2006/0047170 | A1 | | 3/2006 | Keggenhoff et al. |
| 2007/0297959 | A1 | | 12/2007 | Suzuta et al. |

FOREIGN PATENT DOCUMENTS

| | | |
|---|---|---|
| DE | 10 2004 041 777 | 3/2006 |
| EP | 1 813 346 | 8/2007 |
| WO | 03 072237 | 9/2003 |
| WO | 2010 076208 | 7/2010 |

OTHER PUBLICATIONS

Ullmanns Enzyklopadie der technischen Chemie, vol. A 19, pp. 413-414, (1991).
International Search Report Issued Jun. 21, 210 in PCT/EP09/067239 filed Dec. 16, 2009.
U.S. Appl. No. 13/140,227, filed Jul. 29, 2011, Olbert, et al.
U.S. Appl. No. 13/255,665, filed Sep. 9, 2011, Olbert, et al.
U.S. Appl. No. 13/383,549, filed Jan. 11, 2012, Schelling, et al.

* cited by examiner

*Primary Examiner* — Sikarl Witherspoon
(74) *Attorney, Agent, or Firm* — Oblon, Spivak, McClelland, Maier & Neustadt, L.L.P.

(57) ABSTRACT

A reactor (1) for preparing phosgene by gas-phase reaction of carbon monoxide and chlorine in the presence of a solid-state catalyst, which is provided in the catalyst tubes (2) of a bundle of catalyst tubes (2) which are arranged parallel to one another in the longitudinal direction of the reactor (1) and are welded at each of their two ends into a tube plate (3), with introduction of the starting materials at the upper end of the catalyst tubes (2) and discharge of the gaseous reaction mixture at the lower end of the catalyst tubes (2), in each case via a cap, and also with introduction and discharge facilities for a liquid heat transfer medium (6) in the intermediate space (4) between the catalyst tubes (2), where the flow of the heat transfer medium (6) in the space (4) between the catalyst tubes (2) is guided by deflection plates (5), which leave alternating openings (7) free on opposite sides at the interior wall of the reactor, in which openings the deflection plates (5) have cutouts having the shape of a segment of a circle, and the reactor (1) has no tubes in the region of the openings (7), wherein the heat transfer coefficients at the interface between the catalyst tubes (2) and the heat transfer medium (6) are equalized over each reactor cross section by the flow paths of the heat transfer medium (6) in each reactor cross section, in each case measured from the first to last catalyst tube (2) in the flow direction of the heat transfer medium (6), being matched to one another by means of an altered arrangement of the catalyst tubes (2), is proposed.

16 Claims, 6 Drawing Sheets

REACTOR AND PROCESS FOR PREPARING PHOSGENE

CROSS-REFERENCE TO RELATED APPLICATIONS

This application is a National Stage of PCT/EP2009/67239 filed on Dec. 16, 2009. This application is based upon and claims the benefit of priority to European Application No. 08171726.6 filed on Dec. 16, 2008.

BACKGROUND OF THE INVENTION

Description

The invention relates to a reactor and a process for preparing phosgene by gas-phase reaction of carbon monoxide and chlorine in the presence of a solid-state catalyst.

Phosgene is prepared industrially in a catalytic gas-phase reaction of carbon monoxide and chlorine in the presence of a solid-state catalyst, preferably activated carbon. The reaction is strongly exothermic; the formation enthalpy is −107.6 kJ/mol. The reaction is generally carried out in a shell-and-tube reactor using the process described in Ullmanns Enzyklopädie der technischen Chemie, vol. A 19, pages 413 to 414. According to this reference, the particulate catalyst having a particle size in the range from 3 to 5 mm is used in tubes having an internal diameter of from 50 to 70 mm. The reaction commences at from 40 to 50° C., the temperature in the tubes increases to about 580° C. and then drops again. Carbon monoxide is used in a small excess in order to ensure that all the chlorine is reacted and chlorine-free phosgene is obtained. The reaction can be carried out at atmospheric pressure or under superatmospheric pressure, frequently at from 2 to 5 bar in order to be able to condense the phosgene by means of cooling water.

Phosgene is an important auxiliary in the preparation of intermediates and end products in virtually all branches of chemistry. The largest field of use in terms of quantity is the preparation of diisocyanates for polyurethane chemistry, in particular tolylene diisocyanate and 4,4-diisocyanatodiphenylmethane.

To achieve better removal of the heat of reaction via the heat transfer medium circulating between the catalyst tubes, deflection plates are installed between the catalyst tubes in order to induce the heat transfer medium to flow transversely onto the catalyst tubes.

Known shell-and-tube reactors for the preparation of phosgene have a full complement of tubes in order to achieve maximum exploitation of the space in the interior of the reactor. Between the catalyst tubes, they have deflection plates which are kept relatively short, i.e. they do not extend to the interior wall of the reactor in the deflection region but instead leave a proportion of from about 25 to 30% of the total reactor cross section free in order to limit the pressure drop experienced by the heat transfer medium and thus the operating costs for the circulation pump for the heat transfer medium. In the deflection region, the flow profile of the heat transfer medium around the catalyst tubes changes from transverse flow onto the tubes to longitudinal flow along the tubes. The catalyst tubes are cooled less effectively, as a consequence of which corrosion problems occur on the catalyst tubes in the deflection region.

WO 03/072237 describes an improved reactor for preparing phosgene, which makes an increased specific cross-sectional loading and thus a higher capacity possible by avoiding the corrosion problems on the catalyst tubes in the deflection region. For this purpose, WO 03/072237 proposes a reactor having a bundle of catalyst tubes which are arranged parallel to one another in the longitudinal direction of the reactor and are fixed at their ends in tube plates, with a cap at each of the two ends of the reactor and deflection plates which are arranged perpendicular to the longitudinal direction of the reactor in the intermediate space between the catalyst tubes and leave openings free on alternating opposite sides of the interior wall of the reactor, with the catalyst tubes being filled with the solid-state catalyst, the gaseous reaction mixture being passed through the catalyst tubes from one end of the reactor via a cap and being taken off from the opposite end of the reactor via the second cap and a liquid heat transfer medium being passed through the intermediate space around the catalyst tubes and the reactor having no tubes in the region of the openings.

However, it has been found in the case of reactors having a relatively large diameter, in particular from reactor diameters of about 3 m upward, that the pressure drop experienced by the heat transfer medium flowing through the space within the shell over the reactor cross section from one opening at the interior wall of the reactor to the opposite opening at the interior wall of the reactor becomes too great as the reactor diameter increases. Furthermore, the losses of heat transfer medium and thus the pressure drop over the gap between the outer wall of the catalyst tubes and the deflection plates which is present for manufacturing reasons also become too great. Correspondingly, the outlay for the pump for the heat transfer medium becomes too great.

In addition, the large pressure drop over the reactor cross section between the two opposite openings at the interior wall of the reactor leads to larger differences in the heat transfer coefficients at the interface between the catalyst tubes and the heat transfer medium, as a result of which factors of 1:2 can occur between regions having good heat transfer and regions having poor heat transfer within a reactor cross section. As a result, the catalyst tubes in the regions having poor heat transfer are cooled less well. However, since the catalyst tubes have, depending on the material used, in particular duplex steel, a maximum operating temperature, frequently in the range from about 160 to 200° C., in particular from 170 to 180° C., which must not be exceeded because otherwise the corrosion of the material increases greatly, the regions having poor heat transfer limit the throughput and thus the capacity of the reactor.

In the light of this prior art, it was an object of the invention to provide a technically simple and elegant solution which allows industrial reactors for the preparation of phosgene having large reactor diameters of over 2 or even over 3.5 m to be operated at a higher throughput than known reactors without it being necessary to increase the circulated amount of heat transfer medium while at the same time reducing the corrosion problems by matching of the heat transfer coefficients at the interface between catalyst tubes and heat transfer medium over the reactor cross section.

BRIEF DESCRIPTION OF THE INVENTION

The object is achieved by a reactor for preparing phosgene by gas-phase reaction of carbon monoxide and chlorine in the presence of a solid-state catalyst, which is provided in the catalyst tubes of a bundle of catalyst tubes which are welded at each of their two ends into a tube plate, with introduction of the starting materials at the upper end of the catalyst tubes and discharge of the gaseous reaction mixture at the lower end of the catalyst tubes, in each case via a cap, and also with introduction and discharge facilities for a liquid heat transfer medium in the space between the catalyst tubes within the shell, where the flow of the heat transfer medium in the intermediate space between the catalyst tubes is guided by deflection plates, which have alternating openings free on opposite sides at the interior wall of the reactor, in which openings the deflection plates have cutouts having the shape of a segment of a circle, and the reactor has no tubes in the region of the openings, wherein the heat transfer coefficients at the interface between the catalyst tubes and the heat transfer medium are equalized over each reactor cross section by the flow paths of the heat transfer medium in each reactor cross section, in each case measured from the first to last catalyst tube in the flow direction of the heat transfer medium, being matched to one another by means of an altered arrangement of the catalyst tubes.

DETAILED DESCRIPTION OF THE INVENTION

Figure 1:
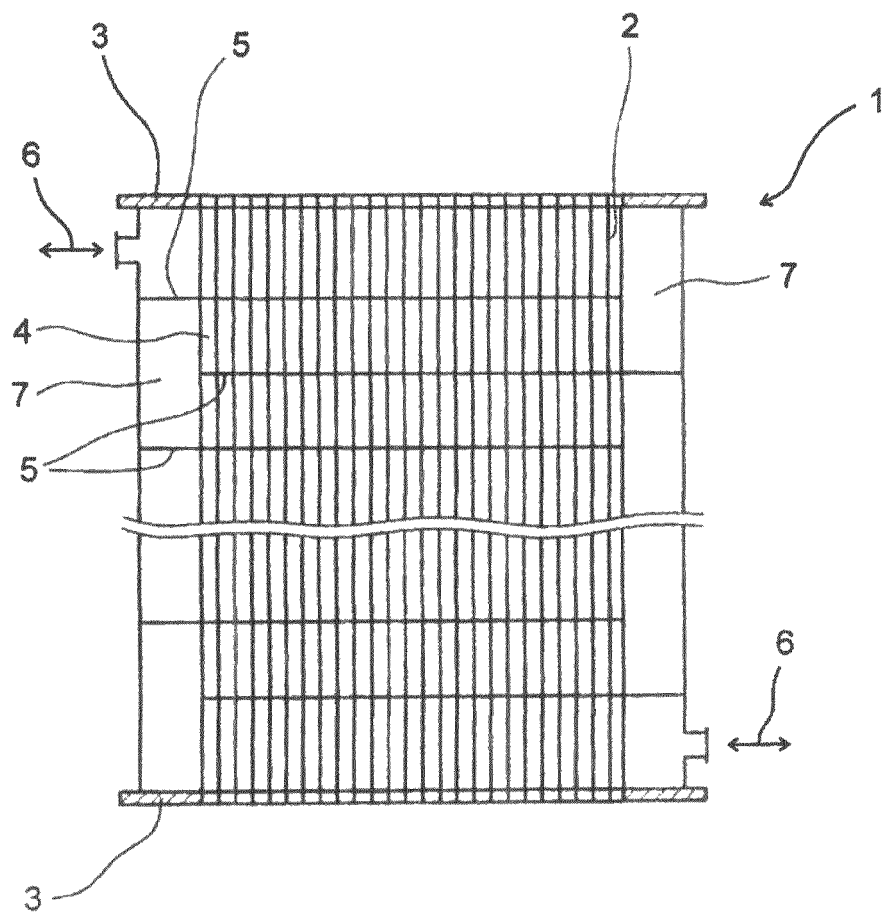
FIG. 1 depcits a schematic cross section through an embodiment of a reactor according to the invention.

It has been found that it is possible to match the heat transfer coefficients to one another at the interface between catalyst tubes and heat transfer medium over the reactor cross section to a substantial extent and accordingly effect a substantial reduction in critical regions having high heat transfer coefficients, i.e. with poor heat transfer, by means of an altered arrangement of the catalyst tubes.

For the flow of the heat transfer medium in the outer space of the reactor between two deflection plates, within a reactor cross section, from one tube-free region (opening) to the opposite tube-free region, in each case at the interior wall of the reactor, the pressure drop is the same for all flow paths of the heat transfer medium.

The pressure drop $\Delta p$ can be described by the following equation:

$$\Delta p = l/d_R (\zeta_1 \cdot \eta \cdot v + \zeta_2 \cdot \rho/2 v^2),$$

where $\Delta p$ is the pressure drop in pascal, $\zeta_1$ and $\zeta_2$ are the dimensionless pressure drop coefficients, $l$ is the length of the flow path in m, $d_R$ is the diameter of a catalyst tube (characteristic parameter) in m, $\rho$ is the density in kg/m$^3$, $v$ is the velocity in m/s and $\eta$ is the viscosity in Pa·s.

In the above formula, the first term corresponds to a laminar component of the pressure drop which is proportional to the viscosity and the second term corresponds to a turbulent component which is proportional to the square of the velocity.

Since the pressure drop is the same for every flow path, the velocity of the heat transfer medium is, according to the above formula for the pressure drop, correspondingly greater for shorter flow paths as occur in the middle of the tube plane of a reactor according to the prior art with mutually opposite boundaries of the bundle of catalyst tubes in the form of chords of a circle compared to flow paths at the interior wall of the reactor, under otherwise unchanged conditions, in particular the same distribution of tubes. Since the heat transfer coefficient $\alpha$ is approximately directly proportional to the velocity to the power of 0.8, lower flow velocities of the heat transfer medium and accordingly lower heat transfer coefficients, i.e. poorer heat transfer, are obtained for the longer flow paths at the interior wall of the reactor compared to the shorter flow paths in the middle of the reactor.

The reactor according to the invention is cylindrical and has an internal diameter of preferably from 0.5 to 6 m, more preferably from 2.5 to 6 m, in particular from 3.5 to 6 m.

A bundle, i.e. a plurality, of catalyst tubes arranged parallel to one another in the longitudinal direction of the reactor is present in the reactor.

The number of catalyst tubes is preferably in the range from 100 to 10000, in particular from 1000 to 3500.

The catalyst tubes are made of a corrosion-resistant material, for example stainless steel, preferably duplex steel 1.4462, stainless steel 1.4571 or stainless steel 1.4541 or nickel-based alloys or nickel. The tube plates or the entire reactor are preferably also made of the abovementioned materials, in particular duplex or stainless steel.

Each catalyst tube preferably has a wall thickness in the range from 2.0 to 4.0 mm, in particular from 2.5 to 3.0 mm, and internal tube diameter in the range from 20 to 90 mm, preferably in the range from 30 to 50 mm.

The catalyst tubes preferably have a length in the range from 1.5 to 6.0 m, in particular in the range from 2.50 to 4.50 m.

The catalyst tubes are preferably arranged in the interior of the reactor so that the ratio of the distance of the midpoints of directly adjacent catalyst tubes to the external diameter of the catalyst tubes is in the range from 1.15 to 1.4, preferably in the range from 1.2 to 1.3, and the catalyst tubes are arranged in a triangular arrangement in the reactor.

The catalyst tubes are fixed, preferably welded, in a liquid-tight manner in tube plates at the two ends. The tube plates likewise comprise a corrosion-resistant material, preferably stainless steel, in particular duplex steel, particularly preferably the same material as the catalyst tubes.

Both ends of the reactor are bounded on the outside by caps. The reaction mixture is fed into the catalyst tubes through one cap, and the product stream is taken off via the cap at the other end of the reactor. The caps are preferably configured so as to be removable and are preferably provided with weld lip seals.

Gas distributors for equalizing the gas flow, for example in the form of a plate, in particular a perforated plate, are preferably arranged in the caps.

Deflection plates are arranged perpendicular to the longitudinal direction of the reactor in the intermediate space between the catalyst tubes, which plates leave alternating openings free on opposite sides at the interior wall of the reactor. The deflection plates effect deflection of the heat transfer medium circulating in the intermediate space between the catalyst tubes in the interior of the reactor so that the heat transfer medium flows transversely against the catalyst tubes, as a result of which heat removal is improved. To achieve this advantageous transverse flow against the catalyst tubes, the deflection plates alternately have to leave openings for the heat transfer medium free on opposite sides of the interior wall of the reactor.

The number of deflection plates is preferably from about 5 to 21. The deflection plates are preferably equidistant from one another, but particular preference is given to the lowermost and the uppermost deflection plate each being further from the tube plate than the distance between two successive deflection plates, preferably by a factor of about 1.5.

The openings left free initially have the shape of a segment of a circle.

The reactor is without tubes in the region of the openings, i.e. it is essentially free of catalyst tubes in this region. In one embodiment, individual catalyst tubes can be arranged in the openings in the deflection regions.

In a further embodiment, the openings are completely free of catalyst tubes.

It is preferred that all deflection plates leave the same openings free.

The area of each opening is preferably from 5 to 20%, in particular from 8 to 14%, of the reactor cross section.

The deflection plates preferably do not form a seal around the catalyst tubes but allow a leakage flow of up to 40% by volume of the total flow of the heat transfer medium. For this purpose, gaps in the range from 0.1 to 0.6 mm, preferably from 0.2 to 0.4 mm, are provided between the catalyst tubes and deflection plates.

It is advantageous to make the deflection plates liquid-tight against the interior wall of the reactor with the exception of the regions of the openings, so that no additional leakage flow occurs at the interior wall.

The deflection plates are preferably made of a corrosion-resistant material, preferably stainless steel, in particular duplex steel, preferably in a thickness of from 8 to 30 mm, preferably from 10 to 20 mm.

The catalyst tubes are filled with a solid-state catalyst, preferably activated carbon. The catalyst bed in the catalyst tubes preferably has a void volume of 0.33 to 0.5, in particular from 0.33 to 0.40.

As a result of the deflection plates initially having cutouts having the shape of a segment of a circle and therefore leaving openings free at the interior wall of the reactor, the tube plane, i.e. the cross section through the catalyst tubes in a horizontal plane between two successive deflection plates will likewise have, since the openings are free of tubes, two cutouts having the shape of a segment of a circle at opposite sides of the interior wall of the reactor.

According to the invention, proceeding from the above-described arrangement of the catalyst tubes as described in the document WO 03/072237, the arrangement of the catalyst tubes is modified by altering the lateral boundaries of the bundle of catalyst tubes in the tube plane from chords of a circle to circular arcs. In this way, the number of catalyst tubes on the longest flow path of the heat transfer medium is, compared to a reactor according to the prior art, reduced to the greatest extent at the interior wall of the reactor and is correspondingly increased in the middle of the reactor. It is not necessary for the lateral boundaries of the bundle of catalyst tubes in the arrangement according to the invention of the catalyst tubes to correspond precisely to a circular arc shape, it is merely preferred that they approximate a circular arc shape.

In particular, the lateral boundaries of the bundle of catalyst tubes can be changed in each case to a polygonal line which is in each case inscribed within a circular arc.

In a further embodiment, the heat transfer coefficients at the interface between the catalyst tubes and the heat transfer medium can be matched to one another by installing dummy tubes in the regions having the poorest heat transfer, i.e. in the regions close to the interior wall of the reactor which have the longest flow paths of the heat transfer medium or by taking catalyst tubes out of this region. Furthermore, it is also possible to close catalyst tubes in the regions which have relatively poor heat transfer coefficients and at which there is a risk of corrosion.

The alternating openings located on opposite sides of the deflection plates can preferably be matched to the lateral boundaries of the bundle of catalyst tubes.

In a further embodiment, it is possible to provide flow-disturbing internals, for example perforated plates, in the inner region of the reactor where the flow paths of the heat transfer medium are shortest and the heat transfer coefficients are therefore greatest, in order to achieve further equalization of the heat transfer coefficients over the entire reactor cross section.

In particular, the change in the arrangement of the catalyst tubes for the purpose of equalizing the flow paths of the heat transfer medium in each reactor cross section can be effected according to the following algorithm:

the tube plane, i.e. the arrangement of the catalyst tubes in a reactor cross section is firstly drawn, with the two opposite lateral boundaries of the bundle of catalyst tubes in the plane being chords of a circle and the main flow direction of the heat transfer medium in the tube plane being designated as the y coordinate and the coordinate at right angles thereto in the plane of the reactor cross section being designated as the x coordinate;

the tube plane is subsequently divided into n straight lines which are parallel to the chords of the circle and are equidistant from one another;

each of the n straight lines is divided into m equidistant points which are numbered consequently with a natural number i, where i=1 to m and the outermost points, i.e. the points i=1 and the points i=m, are each located on the outer margin of the tube plane, i.e. at the wall of the reactor;

the i-th points on the straight lines are in each case joined to one another to give flow paths whose lengths are matched by means of the following iteration steps:

(1) determine the longest flow path $i_{max}$ and shortest flow path $i_{min}$; if more than one longest or shortest flow path exists, make a random choice, (2) determine the difference of the lengths of the flow paths of the shortest and longest flow path, i.e. the inequality of the flow path lengths; if the inequality of the flow path lengths is less than 1% of the mean of the lengths of the flow paths, go to (8);

(3) shorten the longest flow path $i_{max}$ by 25% of the inequality by uniformly reducing the y coordinate of the two outermost points, i.e. the point on the first and the point on the n-th straight line on this flow path and subsequently equidistantly redistributing the points located in between;

(4) the shortest flow path is analogously extended so that the area of the tube plane, i.e. the area bounded by the two chords of a circle and the shell of the reactor, does not change compared to the previous iteration;

(5) in the case of flow paths which are not the outermost flow paths i=1 and i=m, the x coordinates are not changed during this change in the y coordinates of the points;

(6) in the case of one of the two outer curves, the x coordinate is changed in such a way that the points continue to be on the reactor shell; if it is necessary to move a point in the x direction, all points on the line i=n are moved so that they are again equidistant from one another;

(7) go back to (1)

(8) end of the iteration.

In the above algorithm, only the main flow direction of the heat transfer medium in the plane of the reactor cross section, which is here designated as y coordinate, between the openings opposite one another on the interior wall of the reactor is considered. This simplified view is generally sufficient as a basis for determining an altered arrangement of the catalyst tubes.

However, if the flow paths of the heat transfer medium are looked at more precisely, the flow direction perpendicular to the above flow direction in the plane of the reactor cross section has to be taken into account and is here designated as x coordinate.

If only the main flow direction along the y coordinate over the reactor cross section is taken into account, the arrangement of the catalyst tubes has to be altered in such a way that the flow paths in each reactor cross section from the first to last catalyst tube are in each case identical.

However, since the flow of the heat transfer medium along the x coordinate is advantageously also taken into account, to equalize the flow in the x direction, too, the arrangement of the catalyst tubes should be adapted so that the flow paths of the heat transfer medium at the interior wall of the reactor are up to 25% shorter than along the central axis.

As a result of the flow paths being shortened overall compared to a reactor according to the prior art, corresponding to WO 03/072237, by means of the arrangement of the catalyst tubes according to the invention, the pressure drop of the heat transfer medium is lower overall at the same velocity of the heat transfer medium. Correspondingly, the bypass flow of the heat transfer medium through the gaps between the deflection plates and the catalyst tubes is also lower and the amounts of heat transfer medium which have to be circulated are lower.

The invention also provides a reactor for preparing phosgene by gas-phase reaction of carbon monoxide and chlorine in the presence of a solid-state catalyst, in a reactor having a bundle of catalyst tubes comprising the solid-state catalyst, where the catalyst tubes are welded at each of their two ends into a tube plate, with introduction of the starting materials at the upper end of the catalyst tubes and discharge of the gaseous reaction mixture at the lower end of the catalyst tubes, in each case via a cap, and also with introduction and discharge facilities for a liquid heat transfer medium in the space between the catalyst tubes within the shell, where the flow of the heat transfer medium in the intermediate space between the catalyst tubes is guided by deflection plates, which leave alternating openings free on opposite sides at the interior wall of the reactor, in which openings the deflection plates have cutouts having the shape of a segment of a circle, and the reactor has no tubes in the region of the openings, wherein the heat transfer coefficients at the interface between the catalyst tubes and the heat transfer medium are equalized over each reactor cross section by the flow paths of the heat transfer medium in each reactor cross section, in each case measured from the first to last catalyst tube in the flow direction of the heat transfer medium, being matched to one another by means of an altered arrangement of the catalyst tubes.

The flow paths of the heat transfer medium in each reactor cross section, in each case measured from the first catalyst tube to the last catalyst tube in the flow direction of the heat transfer medium, can preferably be further matched to one another by installation of dummy tubes.

The arrangement according to the invention of the catalyst tubes enables the heat transfer coefficients for large reactors for preparing phosgene, having diameters of 3.5 m and more, for each reactor cross section to be reduced from differences of from about 13 to 20% in the case of reactors according to the prior art, corresponding to WO 03/072237, to considerably lower values of only from about 8 to 10%.

The invention is illustrated below with the aid of examples and a drawing.

Phosgene was prepared in an industrial reactor as shown schematically in FIG. 1, with an arrangement of the catalyst tubes corresponding to the prior art known from the document WO 03/072237 for comparison and with an adapted arrangement of the catalyst tubes corresponding to the invention.

2914 catalyst tubes each having an external diameter of 44.5 mm, a wall thickness of 2.6 mm, a length of 3800 mm, a tube spacing of 55 mm and an arrangement at the corners of equilateral triangles were used.

The catalyst tubes were manufactured from duplex steel 1.4462.

The reactor was cooled by means of monochlorobenzene as heat transfer medium, with the monochlorobenzene being conveyed through the reactor shell from the top downward with a meandering flow around the deflection plates. The coolant flow rate was 1800 t/h of monochlorobenzene, the inlet temperature of the monochlorobenzene was 67° C. and the outlet temperature of the monochlorobenzene was 78.4° C. in the exemplary embodiment according to the prior art and in the exemplary embodiment according to the invention without increased phosgene loading, but 80.8° C. in the exemplary embodiment according to the invention with increased phosgene loading.

Carbon monoxide and chlorine were passed through the catalyst tubes from the top downward over activated carbon as solid catalyst, with the carbon monoxide excess being 3.5% by weight, the inlet temperature of the reaction gas mixture being 40° C. and the inlet pressure of the reaction mixture being 4.8 bar absolute.

The amount of phosgene produced was 26 17 kg/h both in the exemplary embodiment according to the prior art and in the first example according to the invention and was 32060 kg/h in the second exemplary embodiment according to the invention.

The heat removal was 8.25 megawatt in the exemplary embodiment according to the prior art and in the first exemplary embodiment according to the invention, and 9.9 megawatt in the second exemplary embodiment according to the invention.

In the case of the exemplary embodiment according to the prior art, a worst heat transfer coefficient of 1000 $W/m^2/K$ was achieved on the coolant side. This limited the heat removal and at a phosgene loading of 2.1 kg of phosgene/$m^2$/s led to an interior wall temperature of the catalyst tubes of 168° C.

Figure 3:
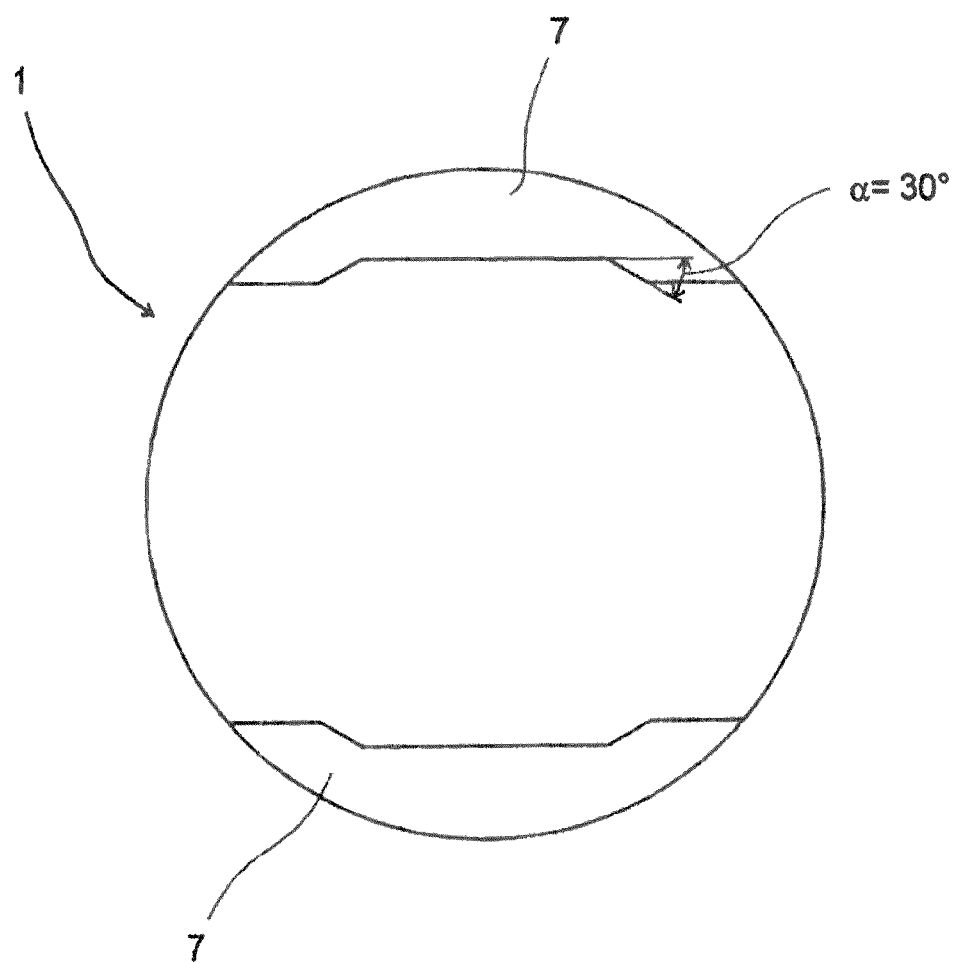
FIG. 3 depicts a tube plane through an embodiment of a reactor according to the invention as used in the exemplary embodiments.

According to the example according to the invention, the arrangement of the tubes was altered so that the tube plane corresponded to the schematic depiction in FIG. 3, with the flow paths of the heat transfer medium being matched to one another over the reactor cross section. In this way, the worst heat transfer coefficient over the reactor cross section was increased to 1150 $W/m^2/K$. Under otherwise unchanged process conditions, this led to a lower interior wall temperature of the catalyst tubes of 160° C.

Since a temperature of up to 168° C. is not critical for the material of the catalyst tubes, there was therefore the opportunity of increasing the phosgene loading for the reactor having the arrangement according to the invention of the catalyst tubes. To obtain an interior wall temperature of the tubes of a noncritical 168° C. once again, it was possible to increase the phosgene loading by 20%, from 2.1 kg of phosgene/m$^2$/s to 2.52 kg of phosgene per m$^2$/s.

The reactor 1 shown schematically in longitudinal section in FIG. 1 has a bundle of catalyst tubes 2 which are welded into an upper tube plate and a lower tube plate 3.

A heat transfer medium 6 is conveyed through the space within the shell between the catalyst tubes 2, in one embodiment with introduction of the heat transfer medium 6 at the upper end and discharge at the lower end of the reactor and in a further embodiment with the reverse flow of the heat transfer medium, i.e. with introduction at the lower end of the reactor and discharge at the upper end of the reactor.

The flow of the heat transfer medium 6 through the space 4 within the shell around the catalyst tubes 2 is directed by deflection plates 5 which are arranged horizontally in the reactor and leave alternating openings 7 free at the interior shell of the reactor.

Figure 2A:
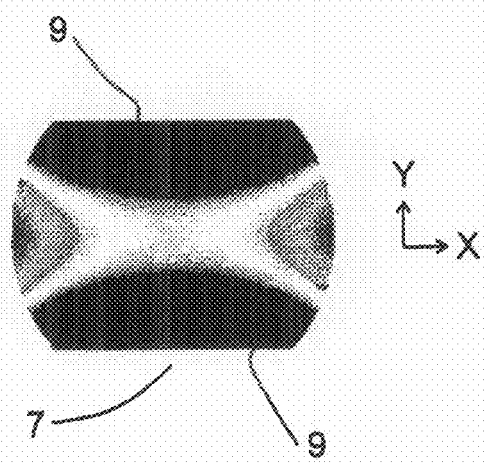
FIGS. 2A-2C depict in each case temperature distributions in the tube plane, with FIG. 2A corresponding to an arrangement of the catalyst tubes according to the prior art and FIGS. 2B and 2C corresponding to arrangements according to the invention of the catalyst tubes.

FIG. 2A shows a tube plane, i.e. an arrangement of the catalyst tubes in a cross section between two successive deflection plates, according to the prior art, with the opposite lateral boundaries of the tube plane being chords of a circle 9. The main flow direction of the heat transfer medium between the two opposite tube-free regions 7 is denoted by y and the flow direction perpendicular thereto, in the cross-sectional plane through the reactor, as x coordinate.

FIG. 1 shows a distribution of the heat transfer coefficients over the tube plane, with the lowest, worst heat transfer coefficients of 1168 W/m$^2$/K on the two tube insides being measured at the extremes of the x coordinate and the best, greatest heat transfer coefficients of 1500 W/m$^2$/K being measured at the two extremes of the y axis at its intersection with the chords of a circle 9.

Figure 2B:
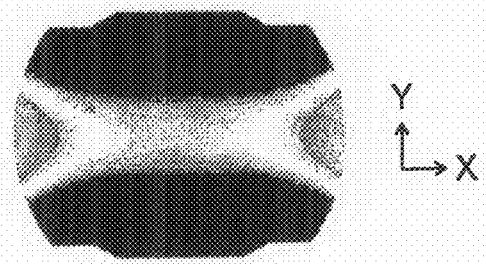

FIG. 2B shows a tube plane with an altered arrangement according to the invention of the catalyst tubes, with the lateral boundaries of chords of a circle 9 according to the prior art having been changed to a polygonal line.

Figure 2C:
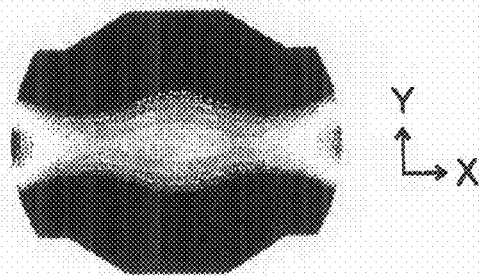

This change is more clearly pronounced in FIG. 2C. Correspondingly, the lowest (worst) heat transfer coefficients of 1308 W/m$^2$/K were measured at the two extremes of the x axis, at the interior wall of the tubes.

FIGS. 2A to 2C thus show that in the case of an arrangement of the catalyst tubes which has been altered according to the invention, the worst heat transfer coefficient is significantly increased compared to the prior art and the regions at risk of corrosion become correspondingly smaller.

FIG. 3 shows a tube plane for an embodiment of a reactor according to the invention as used in the exemplary embodiments. In a reactor having an internal diameter of 3550 mm, the arrangement of the catalyst tubes was altered by changing the lateral boundaries in the tube plane from chords of a circle to a polygonal line having the dimensions in mm indicated in FIG. 3.

Figure 4:
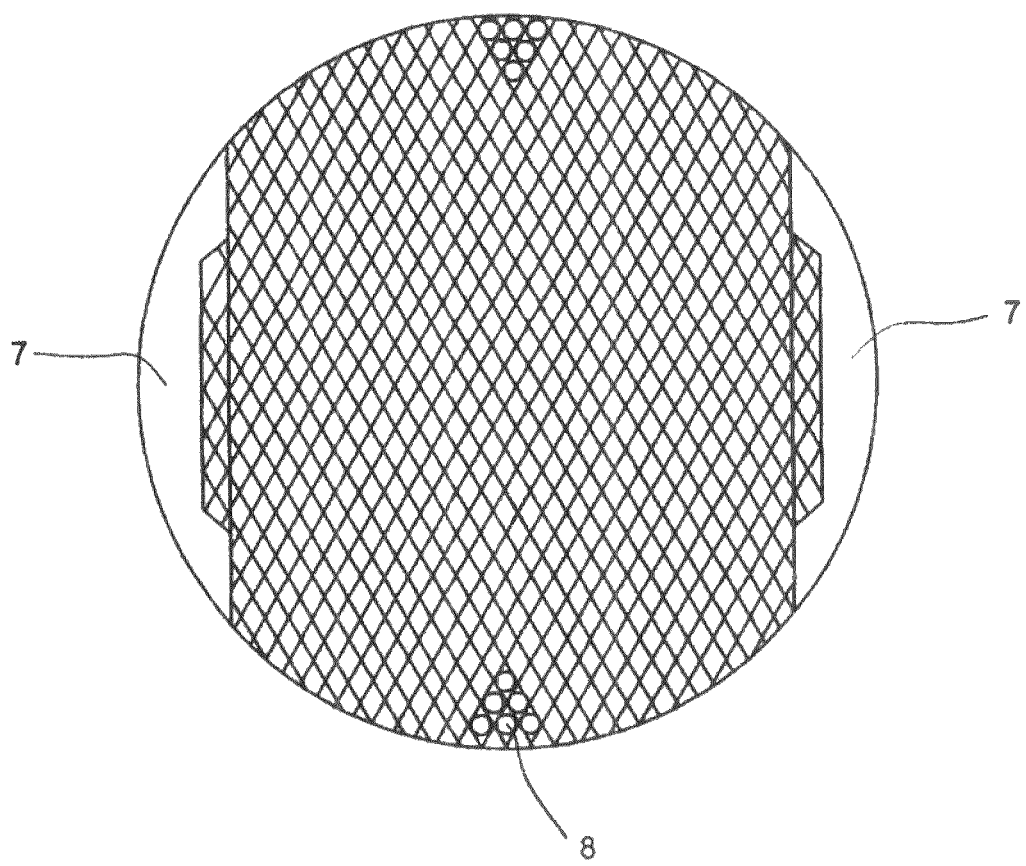
FIG. 4 depicts an embodiment of a reactor according to the invention with additional arrangement of dummy tubes in the regions which are at risk of corrosion.

FIG. 4 shows a cross section through a preferred embodiment of an arrangement according to the invention of catalyst tubes, with dummy tubes being additionally provided in the regions at risk of corrosion.

Figure 5:
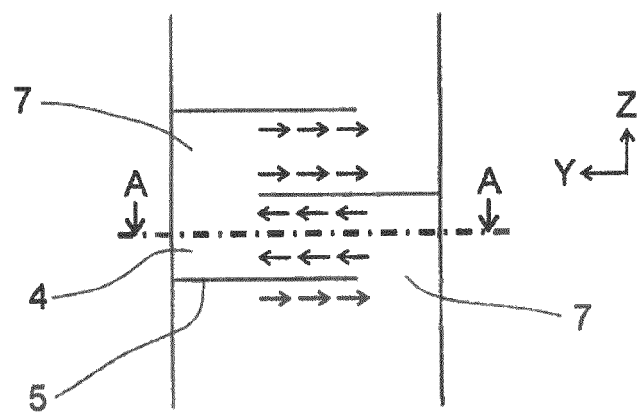
FIG. 5 depicts a schematic depiction of the main flow direction of the heat transfer medium in the regions between the deflection planes, with depiction of the section A-A in FIG. 5A.

FIG. 5 shows a simplified schematic depiction of the main flow direction of the heat transfer medium through the space 4 within the shell between the catalyst tubes, between the deflection plates 5 which leave alternating openings 7 free on opposite sides of the interior shell of the reactor. The main flow direction is designated as the y direction, and the longitudinal direction through the reactor is designated as z coordinate.

Figure 5A:
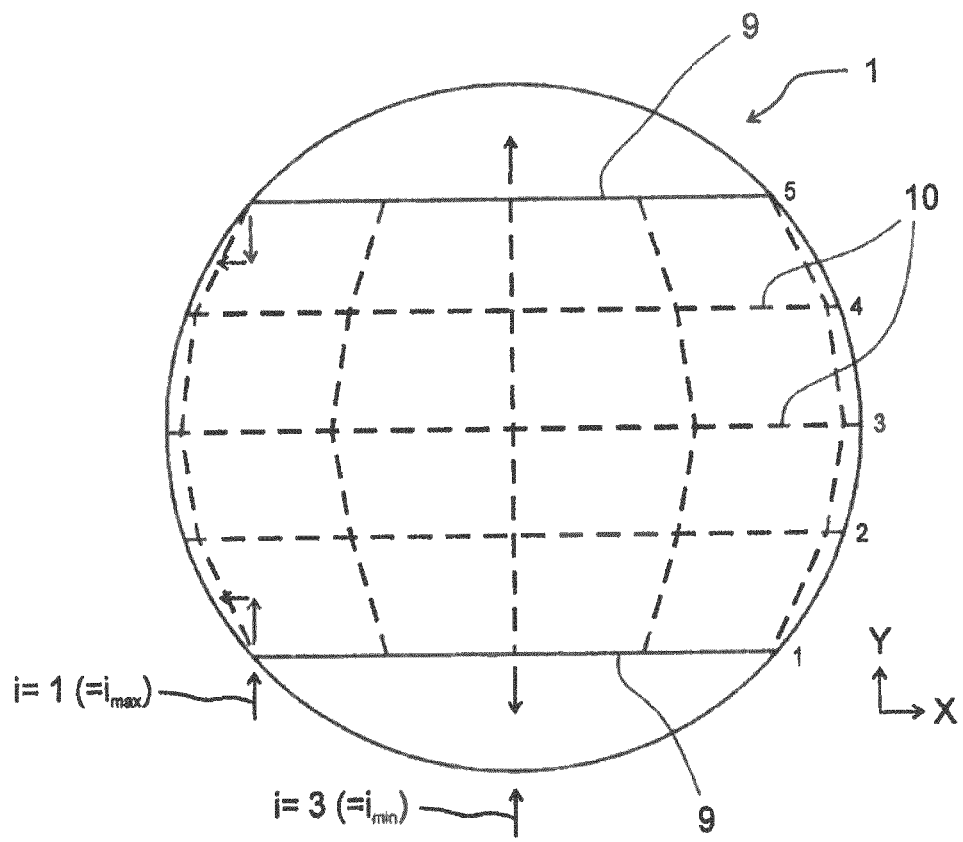

FIG. 5A shows a section through the reactor shown schematically in FIG. 5 in the plane A-A, with illustration of the iterative algorithm for determining the arrangement according to the invention of the catalyst tubes.

The section through the reactor 1 in the plane A-A shows the tube plane according to the prior art used as a starting point in the invention, i.e. with lateral boundaries of the tube plane in the form of chords of a circle 9.

The main flow direction of the heat transfer medium is designated as y coordinate and the coordinate at right angles thereto, in the plane of the reactor cross section, is designated as x coordinate.

In example 3, the tube plane to the chords 9 of a circle is divided into parallel and equidistant straight lines 10. Its straight line 10 is divided into m, in the present case 5, equidistant points, with the first and the last, in the present case the first and the fifth, points each being located on the outermost edge of the tube plane, i.e. at the shell of the reactor 1. The respective i-th points on the straight lines 10 are joined to one another to give the flow paths whose lengths are matched to one another by means of the iteration steps described.

Figure 6:
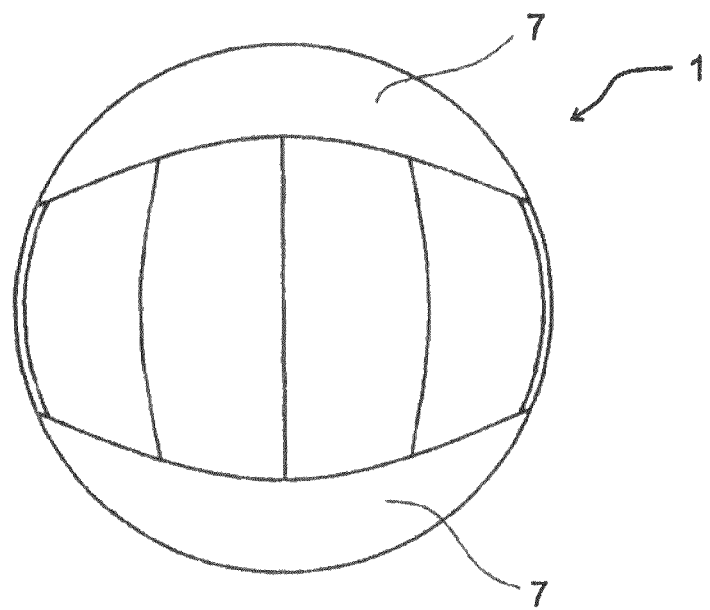
FIG. 6 is a schematic depiction of a tube plane altered according to the invention.

FIG. 6 shows a tube plane for an arrangement according to the invention of the catalyst tubes, in which the lateral boundaries have been changed from chords of a circle to circular arcs.

Figure 7:
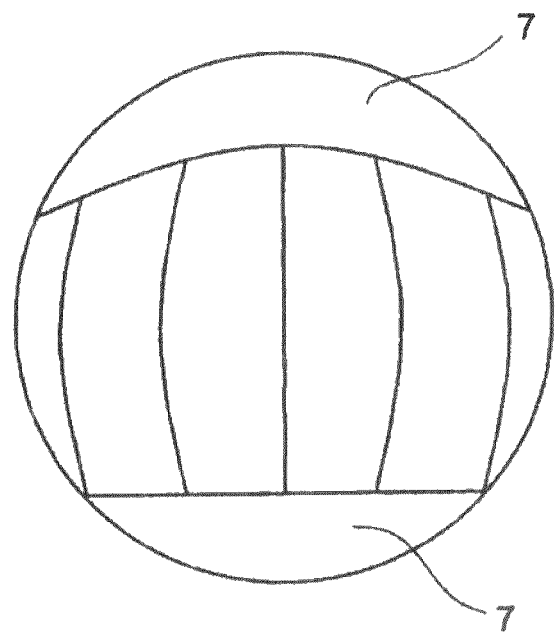
FIG. 7 is a schematic depiction of a further tube plane according to the invention.

FIG. 7 shows a further embodiment of an arrangement according to the invention of the catalyst tubes, in which only one of the lateral boundaries of the tube plane has been changed from a chord of a circle to a circular arc. The second lateral boundary of the tube plane remains in the form of a chord of a circle 9 in this exemplary embodiment.

The invention claimed is:

1. A cylindrical reactor for preparing phosgene, the reactor comprising:
   a bundle of catalyst tubes which are arranged parallel to one another in the longitudinal direction of a reactor and are welded at each of their two ends into a tube plate, such that introduction to and discharge from the catalyst tubes is, in each case, through a cap;
   introduction and discharge facilities for flowing a liquid heat transfer medium through an intermediate space between the catalyst tubes within a shell; and
   a plurality of deflection plates for guiding the flow of the heat transfer medium in the intermediate space, said deflection plates arranged such that alternating openings exist on opposite sides at an interior wall of the reactor, in which openings the deflection plates have cutouts having the shape of a segment of a circle,
   wherein:
   the reactor has no tubes in the region of the alternating openings;
   heat transfer coefficients at interfaces between the catalyst tubes and the heat transfer medium are equalized over each reactor cross section by flow paths of the heat transfer medium in each reactor cross section being matched to one another by an altered arrangement of the catalyst tubes such that at least one lateral boundary of the bundle of catalyst tubes is not in the shape of a chord of a circle, said flow paths in each case measured from a first catalyst tube to a last catalyst tube in a flow direction of the heat transfer medium.

2. The reactor according to claim 1, further comprising at least one dummy tube, wherein the flow paths of the heat transfer medium in each reactor cross section are further matched to one another by the at least one dummy tube.

3. The reactor according to claim 1, wherein the altered arrangement of the catalyst tubes includes opposite lateral boundaries of the bundle of catalyst tubes being in the shape of circular arcs.

4. The reactor according to claim 1, wherein the altered arrangement of the catalyst tubes includes opposite lateral boundaries of the bundle of catalyst tubes being in the shape of a polygonal line inscribed in a circular arc.

5. The reactor according to claim 1, wherein the alternating openings located on opposite sides of the deflection plates are matched to lateral boundaries of the bundle of catalyst tubes.

6. The reactor according to claim 1, further comprising flow-disturbing internals situated in an inner region of the reactor.

7. A process for preparing phosgene, the process comprising reacting, within the reactor according to claim 1 in the gas phase, carbon monoxide and chlorine in the presence of a solid-state catalyst to form phosgene, wherein:
   the reacting occurs within the catalyst tubes which contain the solid-state catalyst; and
   introduction of starting materials occurs at the upper end of the catalyst tubes and discharge of gaseous reaction mixture occurs at the lower end of the catalyst tubes.

8. The process according to claim 7, wherein the flow paths of the heat transfer medium in each reactor cross section are further matched to one another by at least one dummy tube.

9. The reactor according to claim 1, further comprising flow-disturbing internals in the form of perforated plates situated in an inner region of the reactor.

10. The reactor according to claim 1, wherein the reactor has in internal diameter of from 0.5 to 6 m.

11. The reactor according to claim 1, wherein the reactor has an internal diameter of from 3.5 to 6 m.

12. The reactor according to claim 1, comprising from 100 to 10,000 catalyst tubes having internal tube diameters ranging from 20 to 90 mm and lengths ranging from 1.5 to 6.0 m.

13. The reactor according to claim 1, comprising from 1,000 to 3,500 catalyst tubes having internal tube diameters ranging from 20 to 90 mm and lengths ranging from 1.5 to 6.0 m.

14. The reactor according to claim 10, wherein gaps in the range from 0.1 to 0.6 mm are provided between the catalyst tubes and the deflection plates, such that the deflection plates do not form a seal around the catalyst tubes but allow a leakage flow of up to 40% by volume of the total flow of the heat transfer medium.

15. The reactor according to claim 12, wherein a heat transfer coefficient over a reactor cross section is at least 1150 $W/m^2/K$.

16. The reactor according to claim 13, wherein a heat transfer coefficient over a reactor cross section is at least 1150 $W/m^2/K$.

* * * * *